United States Patent
Kiel

(10) Patent No.: US 9,862,366 B2
(45) Date of Patent: Jan. 9, 2018

(54) CONTROL UNIT

(71) Applicant: WABCO GmbH, Hannover (DE)

(72) Inventor: Bernd-Joachim Kiel, Wunstorf (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/151,976

(22) Filed: May 11, 2016

(65) Prior Publication Data

US 2016/0332608 A1    Nov. 17, 2016

(30) Foreign Application Priority Data

May 15, 2015   (DE) ........................ 10 2015 006 197

(51) Int. Cl.
| | | |
|---|---|---|
| *B60T 13/00* | (2006.01) | |
| *B60T 8/17* | (2006.01) | |
| *B60T 13/68* | (2006.01) | |
| *B60T 15/02* | (2006.01) | |
| *B60T 7/20* | (2006.01) | |

(52) U.S. Cl.
CPC .......... *B60T 8/1708* (2013.01); *B60T 13/683* (2013.01); *B60T 15/027* (2013.01); *B60T 7/20* (2013.01)

(58) Field of Classification Search
CPC .... B60T 8/1708; B60T 15/027; B60T 13/683; B60T 13/665; B60T 13/74; B60T 13/741; B60T 17/16; B60T 17/18; B60T 8/261; B60T 8/885; B60T 7/12; B60T 7/20; B62D 11/08; B64C 25/48; B61K 7/08; B60R 25/08; F16D 2121/02; F16D 2121/06
USPC .......... 303/7, 15, 17, 20, 9.61, 113.1, 115.2, 303/124, 127; 188/106 F, 140 R; 701/70, 78

See application file for complete search history.

(56) References Cited

U.S. PATENT DOCUMENTS

| | | | | |
|---|---|---|---|---|
| 5,466,053 A | * | 11/1995 | Koelzer | ................. B60T 15/22 303/7 |
| 5,986,544 A | * | 11/1999 | Kaisers | ..................... B60T 8/00 280/504 |
| 8,833,868 B2 | | 9/2014 | Bensch et al. | |

(Continued)

FOREIGN PATENT DOCUMENTS

DE        102012105136 A1    12/2013

OTHER PUBLICATIONS

Translation of DE 102012105136 document provided at https://worldwide.espacenet.com/ and dated Jun. 27, 2017.*

*Primary Examiner* — Pamela Rodriguez
(74) *Attorney, Agent, or Firm* — Brinks Gilson & Lione

(57) ABSTRACT

A brake system (1) for a commercial vehicle (100) with a trailer includes a trailer control valve (24), a supply pressure line (46), a control pressure line (44), a valve arrangement for selectively connecting either the supply pressure line (46) or the control pressure line (44) to the trailer control valve (24), and an electronic control unit (10) that is arranged to perform electronic brake control. The valve arrangement is embodied as a structural valve unit (40), that can be switched by the electronic control unit (10) between the switching states connecting a trailer-side pressure line (52) to the control pressure line (44), and connecting the trailer-side pressure line (52) to the supply pressure line (46), and is arranged to subject the trailer-side pressure line (52) to a control pressure in a brake control situation depending on corresponding commands of the electronic control unit (10).

11 Claims, 4 Drawing Sheets

(56) References Cited

U.S. PATENT DOCUMENTS

| | | | | |
|---|---|---|---|---|
| 2005/0029859 A1* | 2/2005 | Bensch | ............... | B60T 7/10 |
| | | | | 303/89 |
| 2009/0114865 A1* | 5/2009 | Homann | ............... | B60T 8/3675 |
| | | | | 251/129.15 |
| 2010/0072810 A1* | 3/2010 | Bensch | ............... | B60T 8/362 |
| | | | | 303/17 |
| 2010/0252378 A1* | 10/2010 | Hilberer | ............... | B60T 7/107 |
| | | | | 188/106 F |

* cited by examiner

CONTROL UNIT

TECHNICAL FIELD

The present invention concerns a brake system for a commercial vehicle with a trailer, with a trailer control valve for activating a trailer brake system from the commercial vehicle, a supply pressure line for subjecting the trailer brake system to a supply pressure, a control pressure line for subjecting the trailer brake system to a control pressure that is controlled by the operator via an input mechanism, for example a brake pedal unit or any other manual input, a valve arrangement for selectively connecting either the supply pressure line or the control pressure line to the trailer control valve, and an electronic control unit that is arranged to carry out electronic brake control.

BACKGROUND

Systems of the type described above are generally known in commercial vehicles. The compressed air sources normally connected to the supply pressure line, which supply one or preferably (for safety reasons) a plurality of brake circuits, are used in a known way to also supply brake pressure to the braked trailer to be coupled to the commercial vehicle.

For controlling the braking processes of the trailer, it is known to provide trailer control valves (ASTV) on the commercial vehicle for transferring the brake pressure. Corresponding brake pressure lines of the trailer are connected to these trailer control valves in order to transfer brake pressure specifically to the trailer.

It is further known from the prior art to provide an electronic interface, by means of which control signals are transferred to the trailer in order to carry out specific braking processes there and to activate brake valves provided on the trailer. These brake valves can for example be ABS valves in the case of electronic brake control.

An electronic control unit that is provided on the commercial vehicle carries out the communications with the trailer in the aforementioned brake system. The electronic control unit of the commercial vehicle usually also controls the electronic brake regulation on the commercial vehicle itself. In order to initiate braking processes in all normal driving situations in which no electronic brake control is involved, the aforementioned brake systems comprise one or a plurality of control pressure lines, by means of which a control pressure is controlled by a brake pedal unit or other control means according to the driver demand and is transferred for example to the brake system of the commercial vehicle. With the brake system of the aforementioned type, such a controlled brake pressure is fed to the trailer control valve by means of the control pressure line in order to make this control pressure available to the brake system of the trailer of the commercial vehicle.

Brake systems of the aforementioned type, as used for example by the present applicant, operate reliably and satisfactorily in practice. However, there is nevertheless a need for further improvement. In particular, with the provision of compressed air for the trailer of the commercial vehicle, and hence the trailer control valve, a number of valve arrangements is necessary for implementing all the required functions, each of which comprises suitable connections and must be mounted separately. All these valves contribute in the totality thereof to a certain cost of assembly and constitute a known risk regarding a compressed air leak. In addition, the valve arrangement produces some unwanted noise during operation owing to the switching process on the one hand and owing to escaping compressed air during venting processes on the other hand, the attenuation of which can be expensive.

SUMMARY OF THE INVENTION

The object of the present invention is to improve the brake systems of the aforementioned type with respect to the aspects mentioned.

The invention achieves the underlying object thereof with a brake system of the aforementioned type in that the valve arrangement is in the form of a structural valve unit, can be switched by means of the electronic control unit between the switching states a) connecting a trailer-side pressure line to the control pressure line, and b) connecting the trailer-side pressure line to the supply pressure line, and in that the valve arrangement is arranged to subject the trailer-side pressure line to a controlling pressure in an electronic brake control situation depending on corresponding commands of the electronic control unit. Here trailer-side means the pressure line that is disposed between the trailer control valve and the valve unit (outlet side of the valve unit). In particular, the invention makes use of the knowledge that the integration of the valve arrangement in a structural unit produces a reduction of the assembly and maintenance costs. Whereas it has long been necessary in the prior art to provide different, structurally separate valves in order to be able to switch between manually controlled brake pressure and supply pressure controlled by the electronic control unit, and on the other hand this switchover is carried out under control, now according to the invention these functional groups are integrated within a valve unit.

With this valve unit it is now possible to activate the trailer control valve specifically and to selectively pass the control pressure or the supply pressure, or perhaps a regulated control pressure differing from the supply pressure, to the trailer control valve. According to the invention, the electronic brake control is preferably selected from the list consisting of ESC, ABS and TCS, or a combination of a plurality of or all of these functions. ESC stands here for Electronic Stability Control. ABS stands for Antilock Brake System here and TCS stands here for Traction Control System.

In a preferred development of the invention, the valve unit can be switched by means of the electronic control unit into the switching state c) venting the trailer-side pressure line. The level of the pressure that arises at the trailer control valve in the electronic brake control situation can be regulated by specific venting of the trailer-side pressure line.

In a further preferred development of the invention, the valve unit can be switched by means of the electronic control unit into the switching state d) holding the pressure in the trailer-side pressure line. By means of the combination of these switching states, the valve unit according to the invention in the form of a structural unit is enabled to increase the brake pressure arising in the trailer-side pressure line towards the level of the supply pressure, to hold the brake pressure at a predefined level, or to reduce the brake pressure towards the level of the ambient pressure by means of venting. Owing to such functionality, in particular separate relay and ABS valves upstream of the trailer control valve can be omitted.

In a preferred embodiment, the valve unit comprises a valve housing with a (first) compressed air port for the supply pressure line, and a (second) compressed air port for the trailer-side pressure line.

Also preferably the valve housing comprises a (third) compressed air port for discharging the venting air.

According to a further preferred embodiment, the valve housing also comprises a (fourth) compressed air port for the control pressure line.

The brake system according to the invention is further developed such that the valve unit comprises a plurality of switching stages disposed together in the valve housing and a flow path extending along the switching stages. Owing to a multi-stage structure in the valve unit, a simple to control, single stranded flow path can be provided, along which the fluid transported through the valve unit successively passes through the different switching stages. A first switching stage is preferably arranged to fluidically connect the flow path selectively either to the (first) compressed air port for the supply pressure line or to the (fourth) compressed air port for the control pressure line. Thus by operating this switching stage, either compressed air at supply pressure or compressed air at control pressure is fed into the flow path of the valve unit.

Also preferably, a second switching stage is arranged to selectively either open the flow path or close the flow path fluid tight. It has proven to be advantageous to design this switching stage as a central switching stage, since with this switching stage the fluid flow flowing in both from the supply pressure line side and the control pressure line side can be blocked, and also the brake pressure possibly arising upstream of the trailer control valve from the trailer-side pressure line.

It is particularly preferable here if a third switching stage is arranged to selectively either connect the flow path to the (second) compressed air port for the trailer-side pressure line, or the (second) compressed air port for the trailer-side pressure line to the (third) compressed air port for discharging the venting air. It is also particularly preferable to arrange the third switching stage to close the flow path fluid tight here. The latter function can alternatively or additionally be ensured by the second switching stage as described above.

In a preferred embodiment of the brake system according to the invention, one, a plurality of or all of the switching stages are in the form of solenoid valves. Solenoid valves have the advantage that they combine a small space requirement with simple activation and a robust construction.

According to a further preferred embodiment of the brake system, the (third) compressed air port of the valve unit for discharging the venting air is fluidically connected to a noise attenuator. According to the invention, the noise of the entire valve unit arising in particular when switching and venting is reduced by the noise attenuator. Therefore, this is especially considered as an advantage, since the connection of noise attenuators to ABS valves is in fact known in the prior art, but not to solenoid valves. As a result of a plurality of (solenoid) valves being arranged together in a housing in at least one preferred embodiment according to the invention, and of the housing comprising only a single venting opening, improved and less expensive noise reduction is achieved compared to the prior art.

In a further aspect, the invention concerns a commercial vehicle with a trailer, wherein the commercial vehicle comprises a pneumatic brake system and the trailer comprises a pneumatic trailer brake system that is activated from the commercial vehicle with the brake system by means of a trailer control valve.

The invention achieves the underlying object thereof for such a commercial vehicle by the brake system being in a form according to one of the previously described preferred embodiments. Regarding the advantages and further preferred embodiments of the commercial vehicle according to the invention, reference is made to the above remarks with regards to the brake system according to the invention.

The invention also concerns the use of a valve arrangement in a brake system of a commercial vehicle, in particular in a brake system according to one of the previously described preferred embodiments, in order to activate a trailer control valve of the commercial vehicle, wherein the valve arrangement is arranged for selectively connecting either a supply pressure line or a control pressure line of the commercial vehicle to the trailer control valve.

The invention achieves the underlying object thereof for such a use by using a valve arrangement in the form of a structural valve unit that can be switched by means of an electronic control unit of the commercial vehicle between the switching states a) connecting a trailer-side pressure line of the commercial vehicle to the control pressure line and b) connecting the trailer-side pressure line to the supply pressure line, and that is arranged to subject the trailer-side pressure line to a control pressure in an electronic brake control situation depending on corresponding commands of the electronic control unit.

Regarding further advantages and preferred embodiments of the use according to the invention, reference is made to the above remarks with regards to the brake system according to the invention and the commercial vehicle according to the invention.

A plurality of exemplary embodiments of the invention is described in detail below. This description will not necessarily represent the exemplary embodiments to scale. Rather, the drawings are carried out in a schematized and/or slightly distorted form where this is useful for the description. For additional information about the lessons to be learned directly from the drawings, refer to the relevant prior art. In doing so it is to be taken into account that diverse modifications and changes relating to the form and the detail of an embodiment can be carried out without deviating from the general idea of the invention. The features of the invention disclosed in the description in the drawings and in the claims can be essentially used both individually and also in any combination for the development of the invention. In addition, all combinations of at least two features disclosed in the description, the drawings and/or the claims fall within the scope of the invention. The general idea of the invention is not limited to the exact form or the detail of the preferred embodiments indicated and described below or limited to a subject that would be limited compared to the subject claimed in the claims. For specified dimensional ranges, values lying within these limits will be disclosed as limit values and shall be able to be used and claimed arbitrarily. For the sake of simplicity, the same reference characters will be used below for identical or similar parts or parts with identical or similar functions.

The invention is described in detail below with reference to the accompanying drawings using a preferred exemplary embodiment.

DETAILED DESCRIPTION OF THE DRAWINGS

Figure 1:
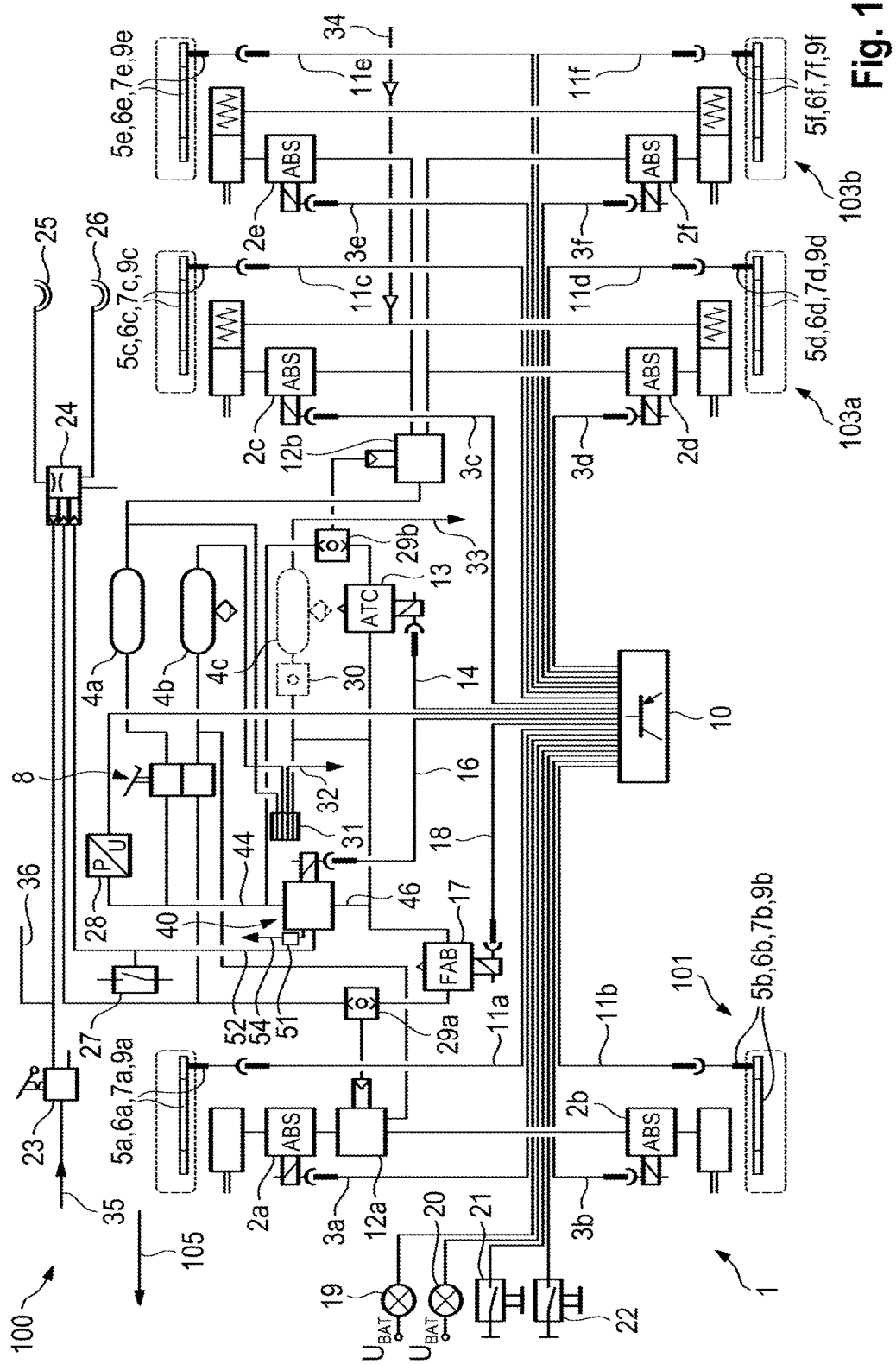
FIG. 1 shows a schematic representation of a commercial vehicle including a brake system according to the present invention.

In FIG. 1 a commercial vehicle 100 is first schematically represented. The commercial vehicle 100 comprises a front axle 101 and two rear axles 103 a, b. The wheels of the front axle 101 and the rear axles 103 a, b are controlled—relative to a direction of travel 105—by means of a brake system 1. The brake system 1 comprises an ABS valve 2 a, b, c, d, e, f for the wheels of each axle. Each of the ABS valves 2 a-f is connected by means of corresponding signal lines 3 a-f to an electronic control unit 10 that is arranged to control the ABS valves 2 a-f, in particular the solenoid valves contained therein. In order to recognize necessary brake control situations, sensors 5 a-f are provided in the wheels of the front axle 101 and the rear axles 103 a, b, which are each fixed in sockets 6 a-f provided therefor and which are arranged to monitor the wheel speeds by means of corresponding gear wheels 7 a-f. Separate mountings 9 a-f can be provided for the respective sensors 5 a-f in a generally known manner.

The sensors 5 a-f are connected to the electronic control unit 10 by means of correspondingly connected signal lines 11 a-f and are designed to transmit corresponding signals relating to the wheel speeds to the electronic control unit 10. The ABS valves 2 a-f of the front axle 101 and of the rear axles 103 a, b are each connected to the pneumatic line system of the commercial vehicle 100 by means of relay valves 12 a, b. The brake system 1 comprises a number of pressure sources 4 a, b, c for providing corresponding supply pressures, which are formed in different, partly redundant circuits for application to the relay valves 12 a, b and hence the ABS valves 2 a-f. A first pressure source 4 a and a second pressure source 4 b are connected by means of a pedal unit 8 to a (first) select-high valve 29 a for the ABS valves 2 a, b on the front axle 101 of the commercial vehicle 100. At least the first pressure source 4 a is connected to a control pressure line 44 by means of the pedal unit 8.

The third pressure source 4 c is connected to a (second) select-high valve 29 b by means of a non-return valve 30 and an ATC valve 13 in order to activate a relay valve 12 b for the activation of the rear axle 103 a, b or for the activation of the associated ABS valves 2 c-f. The third pressure source 4 c is also arranged to provide compressed air for further auxiliary systems by means of the pressure line 33.

Moreover, the third pressure source 4 c has a fluidic connection to a supply pressure line 46 and a FAB valve 17, which is connected to the electronic control unit 10 by means of a signal line 18 and is provided for the activation of the select-high valve 29 a.

The ATC valve 13 is connected to the electronic control unit 10 by means of a signal line 14.

The pressure sources 4 a, b, c are fluidically connected to a protection valve 31, which in turn is fluidicly coupled to a circuit for the pressure supply 32 for the spring-loaded brake of the trailer. The brake system 1 comprises a handbrake valve 23, which is fluidicly connected to a spring-loaded pressure supply 35 and which is used for activating a spring-loaded brake 36.

The brake system 1 also comprises a trailer control valve 24. The trailer control valve 24 is connected to two coupling heads 25 and 26 and is used to provide compressed air for the brake system 1 of the trailer (not shown).

For specific activation of the trailer control valve 24, a valve arrangement is provided in the form of a valve unit 40, which is in the form of a structural unit. The valve unit 40 is connected on the input side to the control pressure line 44 and the supply pressure line 46. The valve unit 40 is connected on the output side to the trailer-side pressure line 52, which leads to the trailer control valve 24. The valve unit 40 also comprises a compressed air port 54 for discharging the venting air from the valve unit 40, to which a noise attenuator 51 can be connected.

The valve unit 40 can be connected to the electronic control unit 10 by means of a signal line 16 and can be activated by this electronic control unit.

Optionally, a brake light switch 27 can be provided, which is switched depending on the pressure in the trailer-side pressure line 52. Optionally, a pressure sensor 28 can also be provided, which interacts with the control pressure line 44 and which has a signal conducting connection to the electronic control unit 10.

The brake system 1 according to FIG. 1 also comprises a warning lamp 19 with a signal conducting connection to the electronic control line and an indicator lamp for the stability controller 20. The brake system 1 according to FIG. 1 also comprises a function switch 21 for the ATC function and a function switch 22 for the ABS function.

The core of the brake system 1 according to FIG. 1 that is essential to the invention is the valve unit 40. The same is shown schematically in detail in a sectional representation in FIG. 2.

Figure 2:
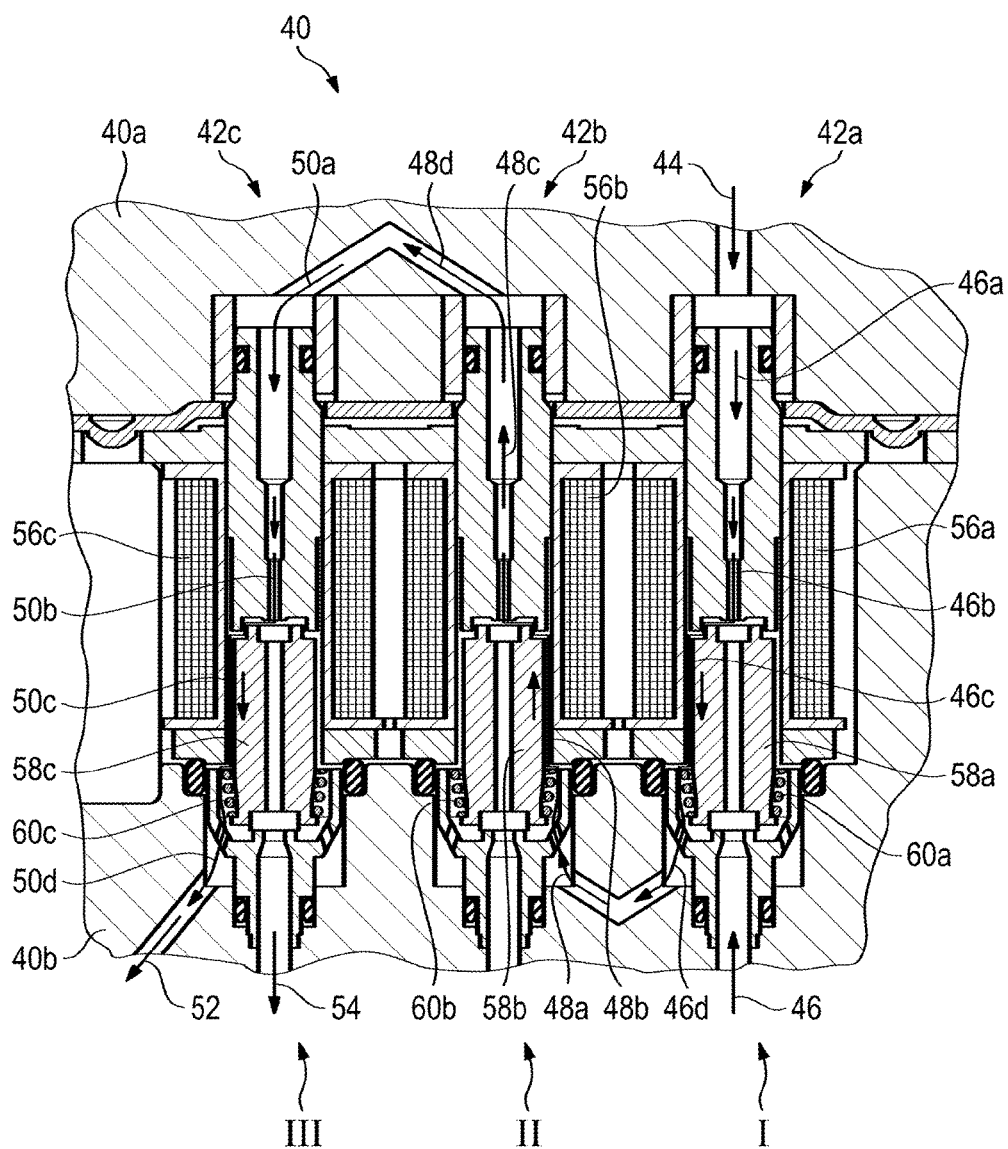
FIG. 2 shows a schematic representation in sectional view of a valve unit of the brake system according to the invention, FIGS. 3 a through c show schematic circuit diagrams of the valve unit according to FIG. 2, and FIGS. 4 a through c show further circuit diagrams of the valve unit according to FIG. 2.

The valve unit 40 shown in FIG. 2 comprises a first housing part 40 a and a second housing part 40 b. A plurality of valves is clamped between the two housing parts 40 a, b, in the present case in the form of solenoid valves 42 a, b, c. The solenoid valve 42 a embodies a first switching stage I, whereas the solenoid valve 42 b embodies a second switching stage II, and the solenoid valve 42 c embodies a third switching stage III. The solenoid valve 42 a is arranged to be switched back and forth between a first switching state and a second switching state. In the first switching state the supply pressure line 46 is connected to a (first) compressed air port. The control pressure line 44 is connected to a further compressed air port. In the indicated switch position according to FIG. 2, the control pressure line 44 is connected to a flow path within the valve unit 40. Fluid flows along the arrows 46 a, b, c, d through the first switching stage I. Here the fluid flows along slots that are formed on the periphery of an armature 58 a. The armature 58 a is moved back and forth between its two switch positions by means of an electrically excited coil 56 a. The fluid passes from the first switching stage I to the second switching stage II and flows through the second switching stage II along the arrows 48 a, b, c, d. If the solenoid valve 42 b of the second switching stage II is moved from the second state in FIG. 2 to another switch position, the fluid is held approximately at the end of the arrow 48 b on the valve seat of the armature 58 b of the second switching stage II. The armature 58 b, which may be slotted, is displaced by means of the coil 56 b.

The fluid from the second switching stage II passes from the solenoid valve 42 c of the third switching stage III, where it flows along the arrows 50 *a, b, c, d* towards the trailer-side pressure line 52, and exits the housing of the valve unit 40 through a corresponding compressed air port. The solenoid valve 42 *c* of the third switching stage III also comprises a slotted armature 58 *c*, which is displaced by means of a coil 56 *c*. If the armature 58 *c* of the third switching stage III is brought from the position according to FIG. 2 into the other switch position thereof, the fluid does not flow along the arrow 50 *d* towards the trailer-side pressure line 52, but flows towards the compressed air port 54 for discharging the venting air, and in fact coming from the compressed air port to the trailer-side pressure line 52.

The solenoid valves 42 *a, b, c* of the three switching stages I, II, III are each biased by means of a spring 60 *a, b, c*.

The second switching stage II is optionally provided for blocking the fluid flow through the valve unit 40 when switching from the switch position shown according to FIG. 2.

Figure 3A:
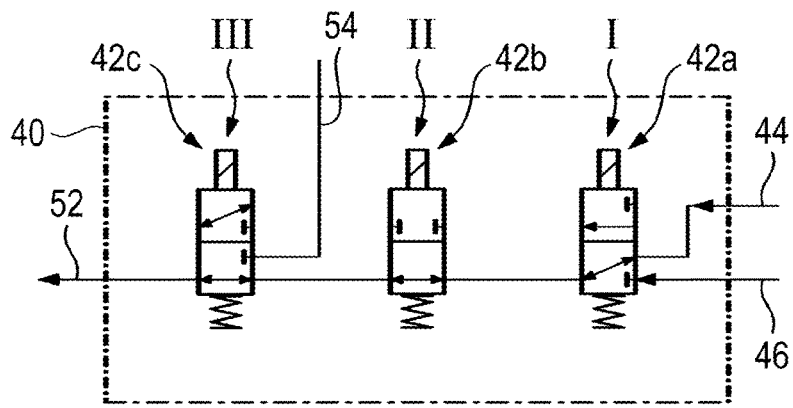
Figure 3B:
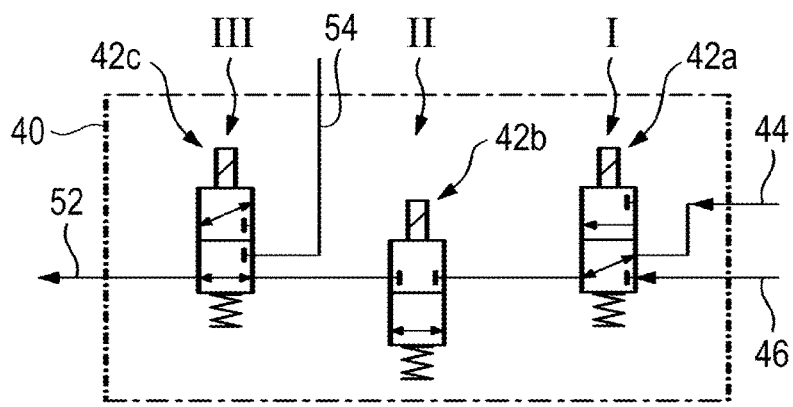
Figure 3C:
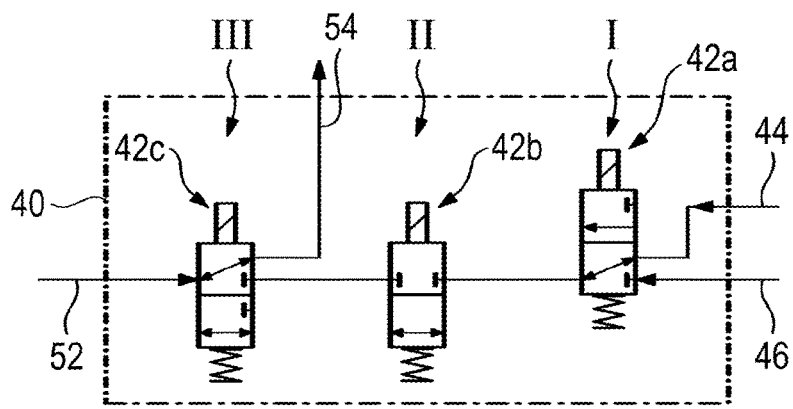

The operation of the valve unit 40 in the brake system according to the invention 1 is illustrated schematically in detail in FIGS. 3 *a* through *c* and 4 *a* through *c*.

FIG. 3 *a* shows the switching state of the valve unit 40 according to the illustration of FIG. 2. The solenoid valve 42 *a* of the first switching stage I is designed so that the flow path to the control pressure line 44 is opened. The fluid flows from the first switching stage I along the flow path to the second switching stage II, in which the solenoid valve 42 *b* is switched to pass the fluid towards the third switching stage III. In the third switching stage III the solenoid valve 42 *c* is switched so that the fluid can flow through the switching stage III and exits the valve unit 40 to the trailer-side pressure line 52. The venting opening 54 is closed in this position.

In the position according to FIG. 3 *b*, the switching state of the switching stages 1 and 3 is the same as the switching state according to FIG. 3 *a*. The switching stage II is switched so that the solenoid valve 42 *b* blocks the fluid flow in both directions, both to the trailer-side pressure line 52 and also to the control pressure line 44.

In FIG. 3 *c*, in addition to the switching of switching stage II, switching stage III is designed so that the solenoid valve 42 *c* allows compressed air from the trailer-side pressure line 52 to escape to the venting opening 54. The additional switching of the second switching stage II is an optional additional protection, in order to reliably inhibit the exiting of fluid, insofar as the trailer-side pressure line 52 is not to be vented.

Figure 4A:
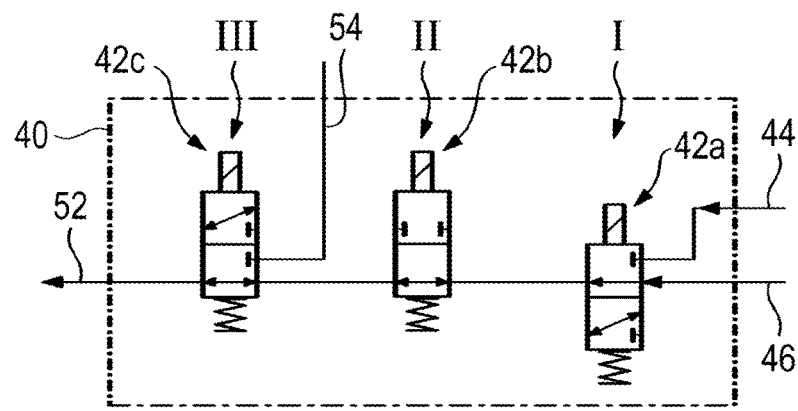
Figure 4B:
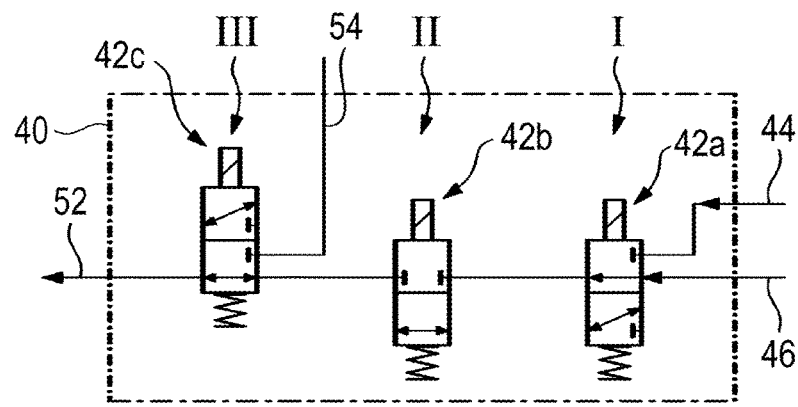
Figure 4C:
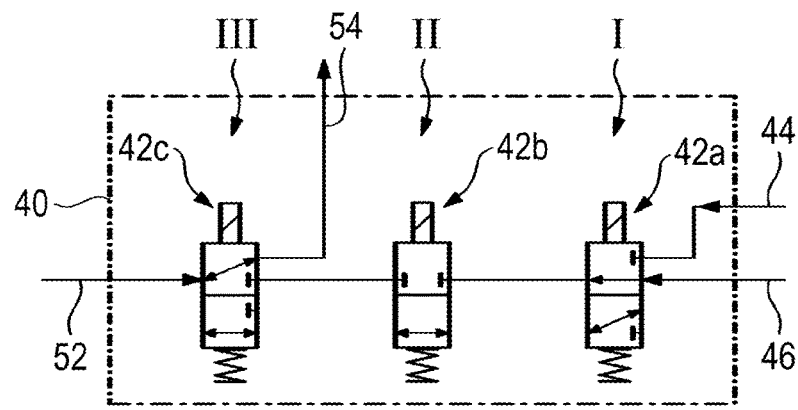

A comparable switching scenario is illustrated in FIGS. 4 *a* through *c*. The switching state according to FIG. 4 *a* is identical to the switching state according to 3 *a* with the exception that the solenoid valve 42 *a* of the first switching stage I is switched so that the fluid coming from the supply pressure line 46 is passed into the flow path of the valve unit 40.

The same applies to FIGS. 4 *b* and 4 *c*, each of which is the same as the switching states of the corresponding FIGS. 3 *b* and 3 *c*, in each case with the exception that the solenoid valve 42 *a* of the first switching stage I does not fluidicly connect the control pressure line 44, but the supply pressure line 46 to the valve unit 40.

As seen from the above description, in particular the drawings, a mechanically and control technologically very simply controllable solution for the underlying object is provided with the invention, which combines the functions of a plurality of previously separate valve units in an inexpensive and structurally robust manner.

While the above description constitutes the preferred embodiments of the present invention, it will be appreciated that the invention is susceptible to modification, variation and change without departing from the proper scope and fair meaning of the accompanying claims.

What is claimed is:

1. A brake system (1) for a commercial vehicle (100) and an attached trailer, with
    a trailer control valve (24) for activating a trailer brake system from the commercial vehicle (100),
    a supply pressure line (46) for subjecting the trailer brake system to a supply pressure,
    a control pressure line (44) for subjecting the trailer brake system to a control pressure that is controlled by an operator via an input mechanism,
    a valve arrangement formed as a valve unit (40) for a selective connection of either the supply pressure line (46) or the control pressure line (44) to the trailer control valve (24), and
    an electronic control unit (10) configured to perform electronic brake control and to switch the valve arrangement between
    a) a first switching state connecting a trailer-side pressure line (52) to the control pressure line (44), and
    b) a second switching state connecting the trailer-side pressure line (52) to the supply pressure line (46),
    wherein the valve arrangement is configured to subject the trailer-side pressure line (52) to a selectable controlled pressure in a brake control situation in response to a corresponding command from the electronic control unit (10),
    wherein the valve unit (40) comprises a valve housing with a compressed air port (54) for discharging venting air, the compressed air port (54) for discharging the venting air being fluidicly connected to a noise attenuator (51).

2. The brake system (1) as claimed in claim 1,
    wherein the electronic control unit (10) is configured to switch the valve unit (40) into
    c) a third switching state venting the trailer-side pressure line (52).

3. The brake system (1) as claimed in claim 1,
    wherein the electronic control unit (10) is configured to switch the valve unit (40) into
    d) a further switching state maintaining the pressure in the trailer-side pressure line (52).

4. The brake system (1) as claimed in claim 1,
    wherein the valve housing comprises a compressed air port for the supply pressure line (46), and a compressed air port for the trailer-side pressure line (52).

5. The brake system (1) as claimed in claim 4,
    wherein the valve unit (40) comprises a plurality of switching stages (I, II, III) disposed in the valve housing and a flow path extending along the switching stages (I, II, III).

6. The brake system (1) as claimed in claim 5,
    wherein at least one of the switching stages is embodied by a solenoid valve (42 *a-c*).

7. The brake system (1) as claimed in claim 1,
    wherein the valve housing comprises a compressed air port for the control pressure line (44).

8. The brake system (1) as claimed in claim 7,
    wherein a first switching stage (I) is configured to fluidicly connect a flow path selectively either to a compressed air port for the supply pressure line (46) or to the compressed air port for the control pressure line (44).

9. The brake system (1) as claimed in claim 8,
wherein a second switching stage (II) is arranged to selectively either open the flow path or close the flow path fluid tight.

10. The brake system (1) as claimed in claim 9,
wherein a third switching stage (III) is configured to connect the flow path selectively either to a compressed air port for the trailer-side pressure line (52), or to connect the compressed air port for the trailer-side pressure line to the compressed air port (54) for discharging the venting air.

11. A commercial vehicle (100) with a trailer, comprising a pneumatic brake system (1) according to claim 1.

* * * * *